(12) United States Patent
Ota et al.

(10) Patent No.: US 10,607,750 B2
(45) Date of Patent: Mar. 31, 2020

(54) INSULATED WIRE

(71) Applicants: SUMITOMO ELECTRIC INDUSTRIES, LTD., Osaka (JP); SUMITOMO ELECTRIC WINTEC, INC., Shiga (JP)

(72) Inventors: Shinya Ota, Osaka (JP); Masaaki Yamauchi, Osaka (JP); Kengo Yoshida, Shiga (JP); Yasushi Tamura, Shiga (JP)

(73) Assignees: SUMITOMO ELECTRIC INDUSTRIES, LTD., Osaka (JP); SUMITOMO ELECTRIC WINTEC, INC., Shiga (JP)

(*) Notice: Subject to any disclaimer, the term of this patent is extended or adjusted under 35 U.S.C. 154(b) by 0 days.

(21) Appl. No.: 16/484,201

(22) PCT Filed: Mar. 21, 2018

(86) PCT No.: PCT/JP2018/011234
§ 371 (c)(1),
(2) Date: Aug. 7, 2019

(87) PCT Pub. No.: WO2018/174113
PCT Pub. Date: Sep. 27, 2018

(65) Prior Publication Data
US 2019/0371496 A1  Dec. 5, 2019

(30) Foreign Application Priority Data

Mar. 24, 2017 (JP) .................... 2017-058687

(51) Int. Cl.
*H01B 7/28* (2006.01)
*H01B 13/06* (2006.01)
(Continued)

(52) U.S. Cl.
CPC ....... *H01B 7/2813* (2013.01); *H01B 13/0016* (2013.01); *H01B 13/06* (2013.01); *H01B 3/46* (2013.01)

(58) Field of Classification Search
CPC .. H01B 7/2813; H01B 13/0016; H01B 13/06; H01B 13/46
See application file for complete search history.

(56) References Cited

U.S. PATENT DOCUMENTS

| 5,192,834 A * | 3/1993 | Yamanishi ........... H01B 7/0233 |
| | | 174/110 F |
| 2010/0096159 A1* | 4/2010 | Abe ...................... H01B 13/16 |
| | | 174/110 F |

(Continued)

FOREIGN PATENT DOCUMENTS

| JP | H08-077849 | 3/1996 |
| JP | 2000-297172 | 10/2000 |

(Continued)

*Primary Examiner* — Timothy J Thompson
*Assistant Examiner* — Amol H Patel
(74) *Attorney, Agent, or Firm* — IPUSA, PLLC

(57) ABSTRACT

An insulated wire according to one embodiment of the present invention includes a linear conductor, and one or a plurality of insulating layers that are laminated on an outer peripheral surface of the conductor, wherein at least one layer of the one or plurality of insulating layers includes a plurality of pores, and a closed porosity within the plurality of pores is 80% by volume or higher.

15 Claims, 2 Drawing Sheets

(51) Int. Cl.
*H01B 13/00* (2006.01)
*H01B 3/46* (2006.01)

(56) References Cited

U.S. PATENT DOCUMENTS

| | | | |
|---|---|---|---|
| 2011/0195197 A1* | 8/2011 | Abe | H01B 13/145 |
| | | | 427/508 |
| 2012/0145433 A1* | 6/2012 | Suzuki | C08L 23/04 |
| | | | 174/110 SR |
| 2013/0087361 A1* | 4/2013 | Kaga | H01B 3/441 |
| | | | 174/102 R |
| 2014/0220343 A1* | 8/2014 | Choi | H01B 3/18 |
| | | | 428/389 |
| 2015/0262732 A1 | 9/2015 | Oya et al. | |

FOREIGN PATENT DOCUMENTS

| | | |
|---|---|---|
| JP | 2008-019379 | 1/2008 |
| JP | 2012-224714 | 11/2012 |
| JP | 2017-016862 | 1/2017 |
| WO | 2014/123122 | 8/2014 |

* cited by examiner

INSULATED WIRE

TECHNICAL FIELD

The present invention relates to an insulated wire.

This application is based upon and claims priority to Japanese Patent Application No. 2017-58687, filed on Mar. 24, 2017, the entire contents of which are incorporated herein by reference.

BACKGROUND ART

In an electrical apparatus applied with a high voltage, such as a motor or the like used at a high voltage, for example, the high voltage is applied to an insulated wire forming the electrical apparatus, and for this reason, a partial discharge (corona discharge) is easily generated at a surface of an insulating layer of the insulated wire. An insulation breakdown occurs at an early stage if a local temperature rise, generation of ozone, generation of ions, or the like are caused by the generation of the corona discharge, and as a result, a service life of the insulated wire and thus the electric apparatus is shortened. Accordingly, the insulated wire used in the electric apparatus applied with the high voltage is required to have an improved corona breakdown voltage, in addition to good insulating properties, mechanical strength, or the like.

As a means of increasing the corona breakdown voltage, it is effective to lower a dielectric constant of the insulating layer. In order to lower the dielectric constant of the insulating layer, an insulated wire, which forms a heat-curing layer (insulating layer) by an insulating varnish including a film-forming resin and a pyrolytic resin decomposable at a temperature lower than a baking temperature of the film-forming resin, has been proposed (refer to Japanese Laid-Open Patent Publication No. 2012-224714). According to this insulated wire, pores are formed within the heat-curing layer by utilizing pores that are formed by thermally decomposed portions of the pyrolytic resin when baking the film-forming resin, and the dielectric constant of the insulating coating can be lowered by the forming of the pores.

PRIOR ART DOCUMENTS

Patent Documents

Patent Document 1: Japanese Laid-Open Patent Publication No. 2012-224714

DISCLOSURE OF THE INVENTION

An insulated wire according to one embodiment of the present invention includes a linear conductor, and one or a plurality of insulating layers that are laminated on an outer peripheral surface of the conductor, wherein at least one layer of the one or plurality of insulating layers includes a plurality of pores, and a closed porosity within the plurality of pores is 80% by volume or higher.

MODE OF CARRYING OUT THE INVENTION

Figure 1:
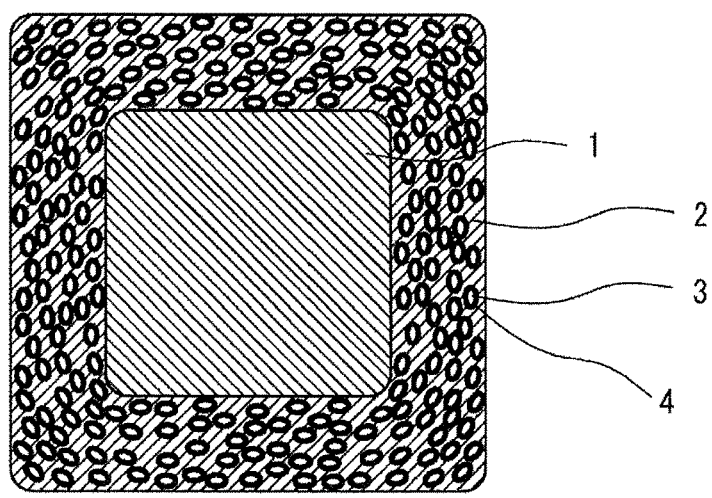
FIG. 1 is a schematic cross sectional view of an insulated wire according to one embodiment of the present invention.

Problem to be Solved by Present Disclosure

In the insulating layer formed by a conventional method such as that described above, the porosity needs to be increased in order to promote lowering of the dielectric constant. However, when the porosity is increased, a desired dielectric constant cannot be obtained due to a large variation in the size of the formed pores or the like, and for this reason, it is difficult to improve the insulating properties, such as increasing the corona breakdown voltage or the like. In addition, it is inconvenient in that a required solvent resistance deteriorates when the insulated wire is used in a state immersed in and exposed to a solvent.

The present invention is conceived based on the above mentioned circumstances, and one object is to provide an insulated wire, which has good insulating properties, mechanical strength, and solvent resistance, and can also promote lowering of the dielectric constant of the insulating layer.

Effects of Present Disclosure

The insulated wire according to one embodiment of the present invention has good insulating properties, mechanical strength, and solvent resistance, and can also promote lowering of the dielectric constant of the insulating layer.

DESCRIPTION OF EMBODIMENTS OF PRESENT INVENTION

An insulated wire according to one embodiment of the present invention includes a linear conductor, and one or a plurality of insulating layers that are laminated on an outer peripheral surface of the conductor, wherein at least one layer of the one or plurality of insulating layers includes a plurality of pores, and a closed porosity within the plurality of pores is 80% by volume or higher.

The insulated wire preferably includes the insulating layer in which communication between the pores is reduced and the above mentioned closed porosity is satisfied, and more preferably, the pores of the insulated wire include an outer shell, the outer shell is derived from a shell of a hollow forming particle having the core shell structure, and the closed porosity within the pores is the above mentioned value or higher. By the provision of the outer shell, the communication between the pores is reduced, and the insulating layer, including the closed pores that are formed at a high proportion, can be more positively obtained. The pores that are formed in this manner have extremely small size and shape variations. By providing the insulating layer including such closed pores, the insulated wire can promote lowering of the dielectric constant compared to the conventional insulated wire having pores formed by a single pyrolytic resin, the insulation breakdown voltage can be made high, and good insulating properties and mechanical strength can be obtained. In addition, because the pores included in the insulating layer have the outer shell at the peripheral part thereof, the solvent resistance can be improved. The terminology "closed porosity" refers to a value that is obtained by a measuring method which will be described later. The core shell structure refers to a structure in which the material forming the core of the particle is different from the material forming the shell which surrounds the periphery of the core.

The porosity of the above mentioned insulating layers is preferably 20% by volume or higher. By making the porosity of the insulating layer hither above mentioned value or higher, it is possible to promote lowering the dielectric constant, and to further improve the insulating properties. The terminology "porosity" refers to a volume of the pores with respect to a volume of the insulating layer including the pores, expressed in percentage.

The shape of the above mentioned pores is preferably a flat sphere shape. In addition, when a short axis of the pores is oriented in a perpendicular direction with respect to a conductor surface, the pores formed in the perpendicular direction in which an external force easily acts uneasily contact each other, to thereby improve the closed porosity. For this reason, a proportion of the pores having the short axis thereof oriented in the perpendicular direction with respect to the conductor surface is preferably as large as possible. The proportions, average diameter, or the like of such pores will be described later. The terminology "flat sphere shape" refers to a sphere having a minor axis that is a predetermined proportion of a major axis or less, where the major axis is a maximum diagonal length passing through a center of gravity, and the minor axis (length of the short axis) is a minimum diagonal length passing through the center of gravity, and a ratio of the minor axis with respect to the major axis in a cross section including the minor axis and the major axis is 0.95 or less, for example.

The main component of the above mentioned outer shell is preferably one of silicones (silicone). By using silicone for the main component of the above mentioned outer shell, it is possible to further increase the closed porosity, and further improve the insulating properties and the mechanical strength. In addition, it is possible to further improve the solvent resistance, and also give elasticity to the outer shell and improve the heat resistance. The terminology "silicone" refers to a polymer including a repeating unit of a siloxane bond in which a silicon atom and an oxygen atom are bonded. Furthermore, a terminology "main component" refers to a component having a largest content, and is a component including 50% per mass or higher, for example.

DETAILS OF EMBODIMENTS OF PRESENT INVENTION

An insulated wire according to one embodiment of the present invention and an insulating layer forming varnish will be described in the following, by referring to typical examples of the insulated wire or the like illustrated in the drawings.

[Insulated Wire]

An insulated wire of FIG. 1 includes a linear conductor 1, and one insulating layer 2 that is laminated on an outer peripheral surface of the conductor 1. The insulating layer 2 includes a plurality of pores 3. In addition, the insulated wire includes an outer shell 4 at a peripheral part of the plurality of pores 3.

<Conductor>

The conductor 1 is a flat wire having a square cross section, for example, but may be a round wire having a circular cross section, or a stranded wire made up of a plurality of twisted bare wires.

A material forming the conductor 1 is preferably a metal having a high conductivity and a large mechanical strength. Examples of such a metal include copper, copper alloys, aluminum, aluminum alloys, nickel, silver, soft iron, steel, stainless steel, or the like. The conductor 1 may use such metal materials to form a wire, or have a multi-layer structure having such a wire material coated with another metal, as in a nickel-coated copper wire, a silver-coated copper wire, a copper-coated aluminum wire, a copper-coated steel wire, or the like, for example.

A lower limit of an average cross sectional area of the conductor 1 is preferably 0.01 $mm^2$, and more preferably 0.1 $mm^2$. On the other hand, an upper limit of the average cross sectional area of the conductor 1 is preferably 20 $mm^2$, and more preferably 5 $mm^2$. When the average cross sectional area of the conductor 1 is less than the above mentioned lower limit, the volume of the insulating layer 2 with respect to the conductor 1 becomes large, and a volumetric efficiency of a coil or the like formed using the insulated wire may deteriorate. On the other hand, when the average cross sectional area of the conductor 1 exceeds the above mentioned upper limit, the insulating layer 2 needs to be formed thick in order to sufficiently lower the dielectric constant, and the diameter of the insulated wire may become unnecessarily large.

<Insulating Layer>

As illustrated in FIG. 1, the insulating layer 2 includes a plurality of pores derived from hollow forming particles having a core shell structure which will be described later.

The insulating layer 2 is formed by a resin composition having insulating properties, the pores 3 scattered within this resin composition, and an outer shell 4 at a peripheral part of the plurality of pores 3. This insulating layer 2 is formed by coating an insulating layer forming varnish, which will be described later, on an outer peripheral surface of the conductor 1, and baking.

A lower limit of a porosity of the insulating layer 2 is preferably 20% by volume, and more preferably 25% by volume. On the other hand, an upper limit of the porosity of the insulating layer 2 is preferably 80% by volume, and more preferably 85% by volume. When the porosity of the insulating layer 2 is less than the above mentioned lower limit, the dielectric constant of the insulating layer 2 does not decrease sufficiently, and it may not be possible to sufficiently improve the corona breakdown voltage. On the other hand, when the porosity of the insulating layer 2 exceeds the above mentioned upper limit, it may not be possible to maintain the mechanical strength of the insulating layer 2. The porosity (% by volume) of the insulating layer 2 can be obtained from a formula $(W1-W2) \times 100/W1$, using a mass W1 of the insulating layer 2 including no pores, which is obtained by multiplying a density $\rho 1$ of the material forming the insulating layer 2 to an apparent volume V1 computed from an outline of the insulating layer 2, and an actual mass W2 of the insulating layer 2.

A lower limit of a closed porosity within the pores 3 is 80% by volume, preferably 85% by volume, and more preferably 90% by volume. On the other hand, an upper limit of the closed porosity within the above mentioned pores is 100% by volume, for example. When the closed porosity within the above mentioned pores is less than above mentioned the lower limit, the insulating properties and a solvent resistance of the insulated wire tend to deteriorate.

The closed porosity within the pores 3 is the % by volume of the pores (closed pores) that are not mutually open due to the resin composition having the insulating properties interposed between adjacent pores when the cross section of a sample of the insulating layer 2 is observed on a Scanning Electron Microscope (SEM), with respect to all of the pores.

This closed porosity (% by volume) can be computed by binarizing the closed pores and the pores other than the closed pores on a SEM photograph of the cross section of the insulating layer, so that the closed pores and the pores other than the closed pores can be distinguished from each other.

Figure 2:
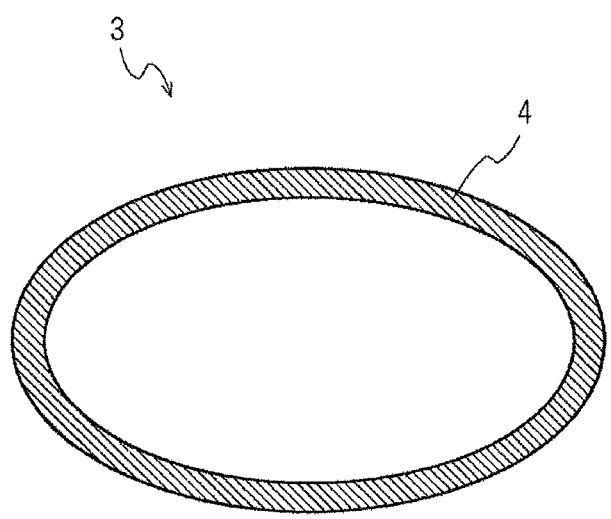
FIG. 2 is a schematic cross sectional view of a pore and an outer shell included in the insulated wire of FIG. 1.
Figure 3:
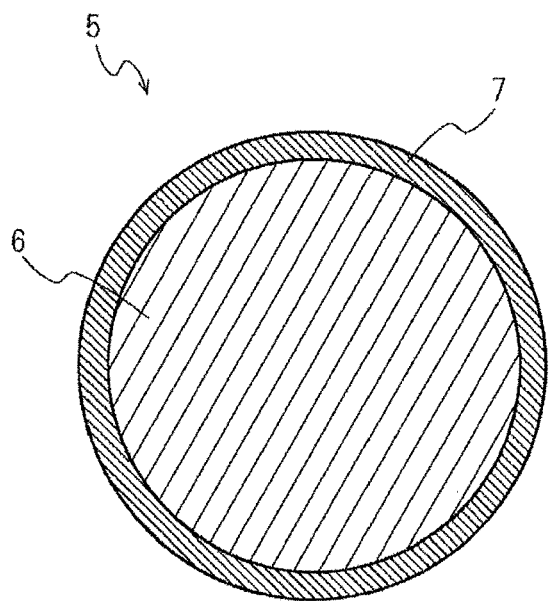
FIG. 3 is a schematic cross sectional view of a hollow forming particle included in an insulating layer forming varnish used to form the insulated wire of FIG. 1.

The plurality of pores 3 are respectively covered by the outer shell 4, as illustrated in FIG. 2, and this outer shell 4 is formed by a shell 7 which becomes hollow after baking by being removed of the core 6 of the hollow forming particle 5 having the core shell structure illustrated in FIG. 3. In other words, the outer shell 4 is derived from the shell 7 of the hollow forming particle 5 having the core shell structure. In addition, at least a part of the outer shells 4 of the plurality of pores 3 includes a defect. This defect can be confirmed from a SEM photograph of the pore cross section observed by the Scanning Electron Microscope (SEM).

The plurality of pores 3 have a flat sphere shape, as illustrated in FIG. 2. In addition, when a short axis of the pores 3 is oriented in a perpendicular direction with respect to the surface of the conductor 1, the pores formed in the perpendicular direction in which an external force easily acts uneasily contact each other, to thereby improve the closed porosity. For this reason, a proportion of the pores 3 having the short axis thereof oriented in the perpendicular direction with respect to the surface of the conductor 1 is preferably as large as possible. A lower limit of the proportion of the pores 3 having the short axis thereof oriented in the perpendicular direction with respect to the surface of the conductor 1, with respect to the the total number of pores 3, is preferably 60%, and more preferably 80%. When the the proportion of the pores 3 having the short axis thereof oriented in the perpendicular direction with respect to the surface of the conductor 1 is less than the above mentioned lower limit, the pores that contact each other increases among the pores that are formed, and the closed porosity may become low. The terminology "pores having the short axis thereof oriented in the perpendicular direction with respect to the surface of the conductor" means that an angular difference between the short axis of the pores and the perpendicular direction with respect to the conductor surface is 20 degrees or less.

A lower limit of an average ratio of lengths of a minor axis with respect to a major axis in a cross section including the minor axis and the major axis of the pores 3 is preferably 0.2, and more preferably 0.3. On the other hand, an upper limit of the above mentioned average ratio is preferably 0.95, and more preferably 0.9. When the average ratio is less than the above mentioned lower limit, an amount of shrinkage along a thickness direction needs to be large during baking of the varnish, and thus, the flexibility of the insulating wire 2 may deteriorate. On the other hand, when the average ratio exceeds the above mentioned upper limit and the porosity is to be made high, the pores formed in the thickness direction of the insulating layer 2 in which the external force easily acts easily make contact with each other, and the closed porosity may become low. The minor axis and the major axis of the pores 3 can be obtained by observing the cross section of the insulating layer 2 by the Scanning Electron Microscope (SEM). The above mentioned ratio can be adjusted by varying a pressure applied to the hollow forming particles 5 due to the shrinkage of the resin composition included in the insulating layer forming varnish during the baking. The pressure applied to the hollow forming particles 5 can be varied according to the kind of material forming a main component of the above mentioned resin composition, the thickness of the insulating layer 2, the material forming the hollow forming particles 5, the baking condition, or the like, for example. The terminology "average ratio of the lengths of the minor axis with respect to the major axis in the cross section including the minor axis and the major axis of the pores" refers to an averaged value of the ratios of the lengths of the minor axis with respect to the major axis in the cross section including the minor axis and the major axis of the pores, computed for 30 pores 3 included in the insulating layer 2, for example.

A lower limit of an average major axis of the pores 3 is not particularly limited, but is preferably 0.1 μm, and more preferably 1 μm. On the other hand, an upper limit of the above mentioned average major axis is preferably 10 μm, and more preferably 8 μm. When the average major axis is less than the above mentioned lower limit, it may not be possible to obtain a desired porosity in the insulating layer 2. On the other hand, when the average major axis exceeds the above mentioned upper limit, it becomes difficult to uniformly distribute the pores 3 within the insulating layer 2, and a distribution of the dielectric constant may easily become offset. The terminology "average major axis of the pores" refers to an averaged value of the major axes computed for 30 pores 3 included in the insulating layer 2, for example.

A lower limit of an average maximum length of the pores 3 in the perpendicular direction with respect to the surface of the conductor 1 is not particularly limited, but is preferably 0.1 μm, and more preferably 1 μm. On the other hand, an upper limit of the above mentioned average maximum length in the perpendicular direction is preferably 10 μm, and more preferably 8 μm. In addition, a lower limit of an average maximum length of the pores 3 in a parallel direction with respect to the surface of the conductor 1 is not particularly limited, but is preferably 0.1 μm, and more preferably 1 μm. On the other hand, an upper limit of the above mentioned average maximum length in the parallel direction is preferably 10 μm, and more preferably 8 μm. The average maximum length of the pores 3 in the above mentioned perpendicular direction and the average maximum length of the pores 3 in the above mentioned parallel direction are both preferably the respective upper limits or less. By making both the average maximum lengths of the pores 3 in the above mentioned perpendicular direction and the parallel direction the respective upper limits or less, the closed porosity within the pores 3 can be improved, and as a result, it is possible to further improve the insulating properties, the mechanical strength, and the solvent resistance of the insulated wire. The terminology "average maximum length of the pores in the perpendicular direction and the average maximum length of the pores in the parallel direction" refer to respective averaged values of the maximum lengths of the pores in the perpendicular direction and the maximum lengths of the pores in the parallel direction with respect to the surface of the conductor 1, computed for 30 pores 3 included in the insulating layer 2, for example.

A lower limit of an average diameter of the pores 3 is preferably 0.1 μm, and more preferably 1 μm. On the other hand, an upper limit of the above mentioned average diameter is preferably 10 μm, and more preferably 8 μm. When the average diameter of the pores 3 is less than the above mentioned lower limit, it may not be possible to obtain the desired porosity in the insulating layer 2. On the other hand, when the average major axis diameter exceeds the above mentioned upper limit, it becomes difficult to uniformly distribute the pores 3 within the insulating layer 2, and the distribution of the dielectric constant may easily become offset. The terminology "average diameter of the pores" refers to an averaged value of diameters of true spheres corresponding to volumes of the pores, computed for 30 pores 3 included in the insulating layer 2, for example. The volumes of the pores 3 can be obtained by observing the cross section of the insulating layer 2 by the Scanning Electron Microscope (SEM). The average diameter of the pores 3 can be adjusted by varying the kind of material forming the main component of the above mentioned resin composition, the thickness of the insulating layer 2, an average particle diameter of pyrolytic resin particles used for the core of the hollow forming particles, the baking condition, or the like, for example.

The distribution of the average diameter of the pores 3 is preferably narrow from a viewpoint of improving the insulation properties of the insulated wire. An upper limit of a ratio ($\sigma/D$) of a standard deviation ($\sigma$) of the average diameter with respect to the average diameter (D) of the pores 3 is preferably 0.3, and more preferably 0.1. A lower limit of the above mentioned ratio is 0.001, for example.

At least a part of the plurality of outer shells 4 existing at the peripheral part of the plurality of pores 3 includes a defect. The pores 3 and the outer shells 4 are derived from the hollow forming particle 5 having the core 6 which includes the pyrolytic resin as the main component, and the shell 7 having a thermal decomposition temperature higher than that of this pyrolytic resin, as illustrated in FIG. 3. In other words, the pyrolytic resin forming the main component of the core 6 is thermally decomposed and gasified during the baking of the varnish included in this hollow forming particle 5, and is dispersed through the shell 7, to form the pore 3 and the outer shell 4. In this state, a trace of the pyrolytic resin dispersed through the shell 7 exists in the outer shell 4 as the defect. The shape of this defect varies depending on the material and the shape of the shell 7, but from a viewpoint of improving the effect of preventing the pores that are formed from communicating through the outer shell 4, the defect is preferably a crack, a slit, or a hole.

The insulating layer 2 may include an outer shell 4 having no defect. Depending on discharge conditions of the pyrolytic resin of the core 6 to the outside of the shell 7, no defect may be formed in the outer shell 4. In addition, the insulating layer 2 may include pores 3 that are not covered by the outer shell 4.

A lower limit of an average thickness of the insulating layer 2 is preferably 5 µm, and more preferably 10 µm. On the other hand, an upper limit of the average thickness of the insulating layer 2 is preferably 200 µm, and more preferably 120 µm. When the average thickness of the insulating layer 2 is less than the above mentioned lower limit, a rupture is formed in the insulating layer 2, and the insulation of the conductor 1 may become insufficient. On the other hand, when the average thickness of the insulating layer 2 exceeds the above mentioned upper limit, the volumetric efficiency of the coil or the like formed using the insulated wire may deteriorate.

In a case where the insulated wire further includes a layer made of the same material as the insulating layer 2 but includes no pores, an upper limit of a ratio of the dielectric constant of the insulating layer 2 with respect to a dielectric constant of this layer that includes no pores, is 95%, preferably 90%, and more preferably 80%. When the ratio of dielectric constants exceeds the above mentioned upper limit, it may not be possible to sufficiently improve the corona breakdown voltage.

Accordingly, in the insulated wire, the pores 3 included in the insulating layer 2 are surrounded by the outer shell 4, and the closed porosity within the pores 3 is high. Because the closed porosity within the pores 3 is high, the insulated wire has good insulating properties, mechanical strength, and solvent resistance, even in a case where the porosity of the insulating layer 2 is increased.

In addition, in the insulated wire, the plurality of pores 3 have the flat sphere shape, and thus, the pores that are formed uneasily contact each other, and the closed porosity within the pores 3 can further be increased.

Insulating Layer Forming Varnish

First Embodiment

The insulating layer forming varnish is a varnish used to form the insulating layer 2 of the insulated wire. The insulating layer forming varnish according to a first embodiment includes a resin composition forming a matrix, and the hollow forming particle 5 having the core shell structure and scattered within this resin composition. The core 6 of the hollow forming particle 5 includes the pyrolytic resin as the main component, and the thermal decomposition temperature of the main component of the shell 7 of the hollow forming particle 5 is higher than the thermal decomposition temperature of the above mentioned pyrolytic resin.

(Resin Composition)

The above mentioned resin composition is a composition including a main polymer, a dilution solvent, and a curing agent. The above mentioned main polymer is not particularly limited, but polyvinyl formal precursor, thermosetting polyurethane precursor, thermosetting acrylic resin precursor, epoxy resin precursor, phenoxy resin precursor, thermosetting polyester precursor, thermosetting polyester imide precursor, thermosetting polyesteramide imide precursor, thermosetting polyamide imide precursor, polyimide precursor, or the like, for example, may be used when a thermosetting resin is used. In addition, polyether imide, polyether ether ketone, polyether sulfone, polyimide, or the like, for example, may be used when a thermoplastic is used as the main polymer. Among these resins, the polyimide and the polyimide precursor are preferable from a viewpoint of facilitating coating of the insulating layer forming varnish and improving the strength and heat resistance properties of the insulating layer 2.

A known organic solvent, conventionally used as insulating varnish, may be used as the dilution solvent. More particularly, examples of the dilution solvent include polar organic solvents such as N-methyl-2-pyrrolidone, N,N-dimethylacetamide, N,N-dimethylformamide, dimethyl sulfoxide, tetramethylurea, hexamethylphosphoric triamide, γ-butyrolactone, or the like; ketones such as acetone, methylethyl ketone, methylisobutyl ketone, cyclohexanone or the like; esters such as methyl acetate, butyl acetate, diethyl oxalate, or the like; ethers such as diethyl ether, ethylene glycol dimethyl ether, diethylene glycol monomethyl ether, ethylene glycol monobutyl ether (butyl cellosolve), diethylene glycol dimethylether, tetrahydrofuran, or the like; hydrocarbons such as hexane, heptane, benzene, toluene, xylene, or the like; halogenated hydrocarbons such as dichloromethane, chlorobenzene, or the like; phenols such as cresol, chlorophenol, or the like; tertiary amines such as pyridine or the like, for example, and these organic solvents may be used independently, or two or more kinds of solvents may be mixed and used.

In addition, the above mentioned resin composition may include a curing agent. Examples of the curing agent include titanium curing agent, isocyanate compound, blocked isocyanate, urea or melamine compound, amino resin, acetylene derivative, alicyclic acid anhydride such as methyl cyclohexene dicarbocylic anhydride, aliphatic acid anhydride, aromatic acid anhydride, or the like, for example. These curing agents are appropriately selected according to the kind of main polymer included in the resin composition that is used. For example, in the case of polyamide imide, imidazole, triethylamine, or the like is preferably used as the curing agent.

Examples of the above mentioned titanium curing agent include tetrapropyl titanate, tetraisopropyl titanate, tetramethyl titanate, tetrabutyl titanate, tetrahexyl titanate, or the like. Examples of the above mentioned isocyanate compounds include aromatic diisocyanates such as tolylene diisocyanate (TDI), diphenylmethane diisocyanate (MDI), p-phenylene diisocyanate, naphthalene diisocyanate, or the like; aliphatic diisocyanates having 3 to 12 carbon atoms, such as hexamethylene diisocyanate (HDI), 2,2,4-trimethylhexane diisocyanate, lysine diisocyanate, or the like; alicyclic isocyanates having 5 to 18 carbon atoms, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate, 1,3-diisocyanatomethyl cyclohexane (hydrogenated XDI), hydrogenated TDI, 2,5-bis(isocyanatomethyl)-bicyclo[2,2,1]heptane, 2,6-bis(isocyanatomethyl)-bicyclo[2,2,1]heptane, or the like; aliphatic diisocyanates having aromatic ring, such as tetramethylxylene diisocyanate (TMXDI), or the like; modified products thereof; or the like. Examples of the above mentioned blocked isocyanate include compounds or the like added with a blocking agent such as dimethylpyrazole or the like to isocyanate groups such as diphenylmethane-4,4'-diisocyanate (MDI), diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, naphthylene-1,5-diisocyanate, m-xylene diisocyanate, p-xylene diisocyanate, or the like. Examples of the above mentioned melamine compound include methylated melamine, butylated melamine, methylolated melamine, butylolated melamine, or the like. Examples of the above mentioned acetylene derivative include ethynyl aniline, ethynyl phthalic anhydride, or the like.

(Hollow Forming Particle)

The above mentioned hollow forming particle 5 includes the core 6 having the pyrolytic resin as the main component, and the shell 7 having the thermal decomposition temperature higher than that of this pyrolytic resin, as illustrated in FIG. 3.

(Core)

For example, resin particles that thermally decomposes at a temperature lower than the baking temperature of the above mentioned main polymer, are used as the pyrolytic resin forming the main component of the core 6. The baking temperature of the above mentioned main polymer is appropriately set according to the kind of resin, and is normally on the order of 200° C. or higher and 600° C. or lower. Accordingly, a lower limit of the thermal decomposition temperature of the pyrolytic resin used for the core 6 of the hollow forming particle 5 is preferably 200° C., and an upper limit of the thermal decomposition temperature is preferably 400° C. The thermal decomposition temperature refers to a temperature at which a mass reduction rate becomes 50% as the temperature rises from room temperature at a rate of 10° C./minute under air atmosphere. The thermal decomposition temperature may be obtained by thermogravimetry using a thermogravimetry-differential thermal analyzer (TG/DTA manufactured by SII Nano Technology Inc.), for example.

The pyrolytic resin used for the core 6 of the above mentioned hollow forming particle 5 include, but are not particularly limited to, compounds of polyethylene glycol, polypropylene glycol, or the like having one or both ends or a portion that is alkylated, (meth)acrylated, or epoxydated; polymers of ester (meth)acrylates having an alkyl group with 1 to 6 carbon atoms, such as polymethyl (meth) acrylate, polyethyl (meth)acrylate, polypropyl (meth)acrylate, polybutyl (meth)acrylate, or the like; polymers of modified (meth)acrylates such as urethane oligomer, urethane polymer, urethane (meth)acrylate, epoxy (meth)acrylate, ε-caprolactone (meth)acrylate, or the like; poly(meth) acrylate; crosslinking products thereof; polystyrene, crosslinked polystyrene, or the like, for example. Among these pyrolytic resins, polymers of ester (meth)acrylates having the alkyl group with 1 or more and 6 or less carbon atoms are preferable from a view point of easy thermal decomposition at the baking temperature of the main polymer and easy formation of the pores 3 in the insulating layer 2. An example of such a polymer of ester (meth)acrylate includes polymethyl methacrylate (PMMA), for example.

The shape of the core 6 is preferably a sphere shape. In order to make the shape of the core 6 the sphere shape, spherical pyrolytic resin particles may be used for the core 6, for example. When using the spherical pyrolytic resin particles, a lower limit of the average particle diameter of these resin particles is not particularly limited, but is preferably 0.1 μm, more preferably 0.5 μm, and even more preferably 1 μm. On the other hand, an upper limit of the average particle diameter of the above mentioned resin particles is preferably 15 μm, and more preferably 10 μm. When the average particle diameter of the resin particles is less than the above mentioned lower limit, it may become difficult to manufacture the hollow forming particle 5 using the resin particles for the core 6. On the other hand, when the average particle diameter of the resin particles exceeds the above mentioned upper limit, the hollow forming particle 5 using the resin particles for the core 6 becomes too large, and thus, it becomes difficult to uniformly distribute the pores 3 within the insulating layer 2, and the distribution of the dielectric constant may easily become offset. The average particle diameter of the above mentioned resin particles refers to a particle diameter indicating a highest volume percentage content in a particle size distribution measured by a laser diffraction particle size analyzer.

A material having a thermal decomposition temperature higher than that of the above mentioned pyrolytic resin is used as the main component of the shell 7. In addition, a material having a low dielectric constant and a high heat resistance is preferably used as the main component of the shell 7. Examples of such a material used as the main component of the shell 7 include resins, such as polystyrenes, silicones, fluororesins, polyimides, or the like, for example. Among such materials, silicone is preferable from a viewpoint of giving elasticity to the shell 7 and improving the insulating properties and the heat resistance properties. The terminology "fluororesin" refers to a resin in which at least one hydrogen atom that bonds to a carbon atom forming a repeating unit of a polymer chain is substituted by a fluorine atom or an organic group (hereinafter also referred to as "fluorine atom containing group") having the fluorine atom. In the fluorine atom containing group, at least one hydrogen atom within straight-chain or branched organic group is substituted by the fluorine atom, and examples of such fluorine atom containing group include fluoroalkyl groups, fluoroalkoxy groups, fluoropolyether groups, or the like, for example. The shell 7 may include a metal within a range that does not impair the insulating properties thereof.

The resin forming the main component of the shell 7 may be the same or different kind of resin as the main polymer of the resin composition included in the above mentioned insulating layer forming varnish. For example, even when the same kind of resin as the main polymer of the above mentioned resin composition is used as the resin forming the main component of the shell 7, the resin has a thermal decomposition temperature higher than that of the pyrolytic resin, and because the resin forming the main component of the shell 7 uneasily thermally decomposed even if gasification of the pyrolytic resin occurs, it is possible to make the closed porosity within the pores 3 high. In the case of the insulated wire formed by such an insulating layer forming varnish, it may not be possible to confirm the existence of the outer shell of the pores 3 included in the insulating layer 2 even when observed using an electron microscope. On the other hand, by using the kind of resin different from the main polymer of the above mentioned resin composition as the resin forming the main component of the shell 7, the shell 7 becomes uneasily integrated with the above mentioned resin composition, and the closed porosity within the pores 3 can be made high compared to a case where the same kind of resin as the main polymer of the above mentioned resin composition is used.

A lower limit of the average thickness of the shell 7 is not particularly limited, but is preferably 0.01 μm, and more preferably 0.02 μm. On the other hand, an upper limit of the average thickness of the shell 7 is preferably 0.5 μm, and more preferably 0.4 μm. When the average thickness of the shell 7 is less than the above mentioned lower limit, the closed porosity within the pores 3 may become low. On the other hand, when the average thickness of the shell 7 exceeds the above mentioned upper limit, the volumes of the pores 3 become too small, and thus, it may become difficult to increase the porosity of the insulating layer 2 to a predetermined value or higher. The shell 7 may be formed by a single layer, or may be formed by a plurality of layers. When the shell 7 is formed by the plurality of layers, an average of a total thickness of the plurality of layers may fall within the above mentioned thickness range. The terminology "average thickness of the shell" refers to an averaged value of the thickness of the shell 7, computed for 30 hollow forming particles 5, for example.

An upper limit of a CV value of the hollow forming particle 5 is preferably 30%, and more preferably 20%. When the CV value of the hollow forming particle 5 exceeds the above mentioned upper limit, a plurality of pores 3 having different sizes become included in the insulating layer 2, and thus, the distribution of the dielectric constant may easily become offset. A lower limit of the CV value of the hollow forming particle 5 is not particularly limited, but is preferably 1%. When the CV value of the hollow forming particle 5 is less than the above mentioned lower limit, the cost of the hollow forming particle 5 may become too high. The terminology "CV value" refers to a coefficient of variation prescribed by JIS-Z8825 (2013).

The above mentioned hollow forming particle 5 may have a configuration in which the core 6 is formed by a single pyrolytic resin particle as illustrated in FIG. 3, or may have a configuration in which the core 6 is formed by a plurality of pyrolytic resin particles and the resin of the shell 7 covers the plurality of pyrolytic resin particles.

In addition, the surface of the above mentioned hollow forming particle 5 may be smooth and include no concavo-convex, or may include concavo-convexes.

Further, a lower limit of a resin solids concentration of the insulating layer forming varnish that is prepared by diluting the above mentioned organic solvent and scattering the hollow forming particles 5, is preferably 15% by mass, and more preferably 20% by mass. On the other hand, an upper limit of the resin solids concentration of the insulating layer forming varnish is preferably 50% by mass, and more preferably 30% by mass. When the resin solids concentration of the insulating layer forming varnish is less than the above mentioned lower limit, the thickness formed by one coating of the varnish becomes small, and thus, a number of times the varnish coating process needs to be repeated in order to form the insulating layer 2 to the desired thickness increases, and the time required to perform the varnish coating process may become long. On the other hand, when the resin solids concentration of the insulating layer forming varnish exceeds the above mentioned upper limit, the varnish bodies up, and a storage stability of the varnish may deteriorate.

Moreover, in addition to the hollow forming particles 5, a pore forming agent, such as the pyrolytic particles or the like, may be mixed to the insulating layer forming varnish for the pore formation. In addition, the above mentioned insulating layer forming varnish may be prepared by combining dilution solvents having different boiling points, for the pore formation. Unlike the pores derived from the hollow forming particles 5, the pores formed by the pore forming agent and the pores formed by the combination of the dilution solvents having different boiling points uneasily communicate. Accordingly, even when the powers not covered by the outer shells 4 are included, the closed porosity within the pores 3 can be made high due to the existence of the pores covered by the outer shells 4.

Second Embodiment

The insulating layer forming varnish according to a second embodiment is the varnish used to form the insulating layer of the above mentioned insulated wire, similar to the insulating layer forming varnish according to the first embodiment. The insulating layer forming varnish according to the second embodiment includes the resin composition forming the matrix, and the hollow particles scattered within this resin composition, and the main component of the outer shell of the hollow particle is a resin.

The resin composition of the insulating layer forming varnish may be similar to that of the insulating layer forming varnish according to the first embodiment.

Examples of the resin forming the main component of the hollow particle include polystyrene, silicones, fluororesins, polyimides, or the like, for example. Among such materials, silicone is preferable from a viewpoint of giving elasticity to the outer shell and improving the insulating properties and the heat resistance properties.

A lower limit of the average inner diameter of the hollow particle is not particularly limited, but is preferably 0.1 μm, more preferably 0.2 μm, and even more preferably 1 μm. On the other hand, an upper limit of the average inner diameter of the hollow particle is preferably 15 μm, and more preferably 10 μm. When the average inner diameter of the hollow particle is less than the above mentioned lower limit, it may not be possible to obtain an insulating layer having a desired porosity. On the other hand, when the average inner diameter of the hollow particle exceeds the above mentioned upper limit, it becomes difficult to uniformly distribute the pores within the insulating layer, and the distribution of the dielectric constant may easily become offset. The average inner diameter of the hollow particle may be adjusted by varying the kind of material forming the main component of the above mentioned resin composition, the thickness of the insulating layer 2, the average particle diameter of the pyrolytic resin particles that are used for the cores of the hollow forming particles, the baking condition, or the like, for example. The terminology "average inner diameter of the hollow particle" refers to the averaged value of the diameters of the true spheres corresponding to the volumes of the hollow particles, computed for 30 hollow particles, for example.

A lower limit of the average thickness of the outer shell of the hollow particle is not particularly limited, but is preferably 0.01 µm, and more preferably 0.02 µm. On the other hand, an upper limit of the average thickness of the outer shell is preferably 0.5 µm, and more preferably 0.4 µm. When the average thickness of the outer shell is less than the above mentioned lower limit, the closed porosity within the pores 3 that are formed may become low. On the other hand, when the average thickness of the outer shell exceeds the above mentioned upper limit, the volumes of the pores become too small, and thus, it may become difficult to increase the porosity of the insulating layer to a predetermined value or higher. The outer shell may be formed by a single layer, or may be formed by a plurality of layers. When the outer shell is formed by the plurality of layers, an average of a total thickness of the plurality of layers may fall within the above mentioned thickness range. The average thickness of the outer shell of the hollow particle may be adjusted by varying the kind of material forming the main component of the above mentioned resin composition, the thickness of the insulating layer 2, the average thickness of the shell of the hollow forming particle, the baking condition, or the like, for example.

The CV value of the hollow particles may be similar to that of the hollow forming particles of the insulating layer forming varnish according to the above mentioned first embodiment.

The insulating layer forming varnish may be obtained by heating the insulating layer forming varnish according to the above mentioned first embodiment. In other words, the hollow particles according to this embodiment are obtained by heating the insulating layer forming varnish according to the above mentioned first embodiment, to gasify and remove the pyrolytic resin of the cores of the hollow forming particles. That is, the outer shell of the hollow particle in the insulating layer forming varnish according to this embodiment is derived from the shell of the hollow forming particle having the core shell structure.

[Method of Manufacturing Insulated Wire]

Next, a method of manufacturing the insulated wire will be described. The method of manufacturing the insulated wire includes a process (varnish preparing process) which prepares the insulating layer forming varnish by scattering the hollow forming particles 5 having the core shell structure in the resin composition that is obtained by diluting by the solvent the main polymer for forming the above mentioned insulating layer 2, a process (varnish coating process) which coats the above mentioned insulating layer forming varnish on the outer peripheral surface of the above mentioned conductor 1, and a process (heating process) which removes the core 6 of the above mentioned hollow forming particle 5 by heating.

<Varnish Preparing Process>

In the above mentioned varnish preparing process, first, the main polymer forming the insulating layer 2 is diluted by the solvent, to prepare the resin composition forming the matrix of the insulating layer 2. Next, the hollow forming particles are scattered in this resin composition, to prepare the insulating layer forming varnish. Instead of scattering the hollow forming particles 5 in the resin composition, the above mentioned insulating layer forming varnish may be prepared by mixing the hollow forming particles 5 simultaneously as when the main polymer is diluted by the solvent.

<Varnish Coating Process>

In the above mentioned varnish coating process, after coating the outer peripheral surface of the conductor 1 with the insulating layer forming varnish prepared by the above mentioned varnish preparing process, a coating die is used to adjust the amount of varnish coated on the conductor 1 and to smoothen the coated varnish surface.

The above mentioned coating die has an opening, and excessive varnish is removed by passing the conductor 1, coated with the insulating layer forming varnish, through this opening, to adjust the amount of varnish that is coated. Hence, the thickness of the insulating layer 2 of the insulated wire becomes uniform, and it is possible to obtain uniform electrical insulating properties.

<Heating Process>

Next, in the above mentioned heating process, the conductor 1, coated with the insulating layer forming varnish, is passed through a stove to bake the insulating layer forming varnish, to form the insulating layer 2 on the surface of the conductor 1. During the baking, the pyrolytic resin of the cores 6 in the hollow forming particles 5, included in the insulating layer forming varnish, is gasified by thermal decomposition, and the gasified pyrolytic resin penetrates the shells 7 and are scattered. By this heating during the baking, the cores 6 of the hollow forming particles 5 are removed. As a result, the hollow particles (particles made up solely from the outer shell) derived from the hollow forming particles 5 are formed within the insulating layer 2, and the pores 3 derived from the hollow particles are formed within the insulating layer 2. Accordingly, the above mentioned heating process also serves as a baking process with respect to the insulating layer forming varnish.

The insulated wire is obtained by repeating the above mentioned varnish coating process and the heating process until the insulating layer 2 laminated on the surface of the conductor 1 reaches a predetermined thickness.

Accordingly, the pores 3 derived from the hollow forming particles 5 are included in the insulating layer 2 that is formed using the insulating layer forming varnish. Because the pore 3 is surrounded by the outer shell 4, the closed porosity can be made high, even when the pores are increased to make the porosity of the insulating layer 2 high. In addition, the insulating layer 2 having the pores 3 surrounded by the outer shells 4 can have an insulation breakdown voltage higher than that of the insulating layer having the pores formed by the single pyrolytic resin, and the insulating layer has good insulating properties. Hence, by using the insulating layer forming varnish, good insulating properties, mechanical strength, and solvent resistance can be obtained, even when the porosity of the insulating layer 2 is increased.

The above mentioned heating process may be performed before the varnish preparing process. In this case, by heating the above mentioned hollow forming particles 5 using a thermostatic oven, for example, the pyrolytic resin of the cores 6 is gasified by thermal decomposition, and it is possible to obtain the hollow particles eliminated of the cores 6. In the above mentioned varnish preparing process, the hollow particles are scattered in the above mentioned resin composition forming the matrix of the insulating layer 2, to prepare the insulating layer forming matrix. The hollow structure of the hollow particle, eliminated of the above mentioned core 6, is maintained even after coating and baking of the insulating layer forming varnish, and thus, it is possible to form the insulating layer 2 including the pores 3 formed by the hollow particles by coating and baking the insulating layer forming varnish. However, when performing the heating process before the varnish preparing process, a process which bakes the insulating layer forming varnish, separate from the heating process, is performed after the varnish coating process.

When performing the heating process before the varnish preparing process, it is possible to more positively eliminate the core 6, compared to a case where the core 6 of the hollow forming particle 5 is eliminated by the heating during the baking. For this reason, it is possible to more positively form the insulating layer 2, and blowing of the insulating layer 2 by the decomposition gas of the pyrolytic resin can be reduced.

Other Embodiments

It is to be understood that the embodiments disclosed herein are only illustrative and are not restrictive in all respects. The scope of the present invention is not limited to the configuration of the embodiments, and is defined by the claims described below. The scope of the present invention is intended to cover all the modifications within the meaning and range of equivalents of the claims.

In the above mentioned embodiment, the described insulated wire has a single insulating layer formed on the outer peripheral surface of the conductor, however, the insulated wire may have a plurality of insulating layers laminated on the outer peripheral surface of the conductor. In other words, one or a plurality of insulating layers may be formed between the conductor 1 and the insulating layer 2 including the pores 3 illustrated in FIG. 1, or one or a plurality of insulating layers may be formed on the outer peripheral surface of the insulating layer 2 including the pores 3 illustrated in FIG. 1, or one or a plurality of insulating layers may be formed on both the outer peripheral surface and the inner peripheral surface of the insulating layer 2 including the pores 3 illustrated in FIG. 1. In the insulated wire having the plurality of laminated insulating layers, it is sufficient for at least one insulating layer to include the pores (pores formed by the hollow particles) surrounded by the outer shells. In other words, the pores formed by the hollow particles may be included in two or more insulating layers. When the pores formed by the hollow particles are included in two or more insulating layers, each of the two or more insulating layers contributes to the lowering of the dielectric constant. The insulated wire in which at least one of the plurality of insulating layers is formed by the insulating layer forming varnish, also falls within the scope intended by the present invention. In addition, by laminating the plurality of insulating layers on the outer peripheral surface of the conductor, it is possible to improve the mechanical strength of the insulated wire. The same kind or different kinds of resin compositions may be used to form the plurality of insulating layers.

In the above mentioned embodiments, the described insulated wire has the insulating layer including the pores having the flat sphere shape, however, the pores need not have the flat sphere. For example, the pore surrounded by the outer shell may have a polyhedron or sphere shape which is not flat. Even when the pores have such a non-flat shape, the pores that are formed uneasily communicate with each other due to the outer shells, and the closed porosity within the pores of the insulating layer can be made high. Accordingly, even in the case of the pores having the non-flat shape, it is possible to obtain good insulating properties, mechanical strength, and solvent resistance.

In addition, in the insulated wire, an additional layer, such as a primer (prime coat) layer or the like, may be provided between the conductor and the insulating layer. The primer layer is a layer that is provided to increase adhesion between the layers, and may be formed by known resin compositions, for example.

When providing the primer layer between the conductor and the insulating layer, the resin composition forming this primer layer preferably includes one or a plurality of kinds of resins selected from polyimide, polyamide imide, polyester imide, polyester, and phenoxy resin, for example. In addition, the resin composition forming the primer layer may include an additive such as an adhesion improving agent or the like. By providing the primer layer made of such resin compositions between the conductor and the insulating layer, it is possible to improve the adhesion between the conductor and the insulating layer, and as a result, it is possible to effectively improve properties such as flexibility, wear-resistance, scratch resistance, processing resistance, or the like of the insulating layer.

In addition, the resin composition forming the primer layer may include, together with the above mentioned resin, another resin such as epoxy resin, phenoxy resin, melamine resin, or the like. Moreover, each of the resins included in the resin composition forming the primer layer may be a commercial liquid composition (insulating varnish).

A lower limit of the average thickness of the primer layer is preferably 1 µm, and more preferably 2 µm. On the other hand, an upper limit of the average thickness of the primer layer is preferably 30 µm, and more preferably 20 µm. When the average thickness of the primer layer is less than the above mentioned lower limit, the primer layer may not exhibit a sufficient adhesion with respect to the conductor. On the other hand, when the average thickness of the primer layer exceeds the above mentioned upper limit, the diameter of the insulated wire may become unnecessarily large.

Although the manufacturing method in the above mentioned embodiments generate the pores within the insulating layer using the pyrolytic resin, the manufacturing method may mix a blowing agent or thermally expandable microcapsules to the varnish in place of the pyrolytic resin, and form the pores within the insulating layer by the blowing agent or the thermally expandable microcapsules. In the above mentioned manufacturing method, the insulating layer forming varnish may be prepared by diluting the resin forming the insulating layer by a solvent and mixing thereto the thermally expandable microcapsules, and this insulating layer forming varnish may be coated on the outer peripheral surface of the conductor and baked, for example. During the baking, the thermally expandable microcapsules included in the varnish expand or foam, to form the pores within the insulating layer.

The thermally expandable microcapsule includes a core (inclusion) made of a thermal expanding agent, and an outer shell covering the core. The thermal expanding agent of the thermally expandable microcapsule may be any agent that expands or generates gas when heated, according to any principle. Examples of the thermal expanding agent of the thermally expandable microcapsule include low-melting liquids, chemical blowing agent, and a mixture thereof, for example.

Preferable examples of the low-melting liquid include alkanes such as butane, i-butane, n-pentane, pentane, neopentane, or the like, freon groups such as trichlorofluoromethane, or the like, for example. In addition, examples of the chemical blowing agent preferably include a thermally decomposable substance such as azobisisobutyronitrile which generates $N_2$ gas when heated, or the like.

An expansion starting temperature of the thermal expanding agent of the thermally expandable microcapsule, that is, the melting point of the low-melting liquid or the thermal decomposition temperature of the chemical blowing agent, is a softening temperature of the outer shell of the thermally expandable microcapsule or higher, as will be described later. More particularly, a lower limit of the expansion starting temperature of the thermal expanding agent of the thermally expandable microcapsule is preferably 60° C., and more preferably 70° C. An upper limit of the expansion starting temperature of the thermal expanding agent of the thermally expandable microcapsule is preferably 200° C., and more preferably 150° C. When the expansion starting temperature of the thermal expanding agent of the thermally expandable microcapsule is less than the above mentioned lower limit, the thermally expandable microcapsule may unintentionally expand when manufacturing, transporting, or storing the insulated wire. When the expansion starting temperature of the thermal expanding agent of the thermally expandable microcapsule exceeds the above mentioned upper limit, the energy cost required to expand the thermally expandable microcapsule may become excessively high.

The outer shell of the thermally expandable microcapsule is formed by an extensible material which expands without breaking during the expansion of the thermal expanding agent, and can form a microballoon that includes the generated gas. Normally, a resin composition having a main component formed by a polymer such as a thermoplastic or the like, is used as the material forming the outer shell of the thermally expandable microcapsule.

Preferable examples of the thermoplastic forming the main component of the outer shell of the thermally expandable microcapsule include polymers formed by monomers such as vinyl chloride, vinylidine chloride, acrylonitrile, acrylic acid, methacrylic acid, acrylate, methacrylate, styrene, or the like, or copolymers formed by two or more kinds of such monomers, for example. Preferable examples of the thermoplastic include vinylidene chloride-acrylonitrile copolymer, and the expansion starting temperature of the thermal expanding agent in this case is 80° C. or higher and 150° C. or lower.

In addition, although the above mentioned embodiments have a configuration in which the pores included in the insulating layer are formed by thermal decomposition of the pyrolytic resin, it is possible to employ a configuration in which the pores are formed by a hollow filler, for example. When forming the pores by the hollow filler, the resin composition forming the insulating layer and the hollow filler are kneaded, and the insulating layer is covered by the kneaded material by extrusion molding, to manufacture the insulated wire including the pores in the insulating layer.

When forming the pores by the hollow filler, a cavity part inside the hollow filler forms the pore included in the insulating layer. Examples of the hollow filler include silas balloon, glass balloon, ceramic balloon, organic resin balloon, or the like, for example. Among these materials, the organic resin balloon is preferable when the insulated wire is required to have flexibility. In addition, among these materials, the glass balloon is preferable from a viewpoint of acquiring ease and durability, when placing importance on the mechanical strength of the insulated wire.

Further, although the above mentioned embodiments have a configuration in which the pores included in the insulating layer are formed by thermal decomposition of the pyrolytic resin, it is possible to employ a configuration in which the pores are formed by phase separation method, for example. An example employing the phase separation method uses a pyrolytic resin as the resin forming the insulating layer, and obtains an intimate mixture with a solvent, to coat the intimate mixture on the outer peripheral surface of the conductor. Phase separation of the resin and the solvent is caused by immersion to an insoluble liquid such as water or the like, or by cooling in air atmosphere, and the pores are formed in the insulating layer by extracting and removing the solvent using a separate volatile solvent.

Moreover, the hollow forming particle of the first embodiment, the hollow particle of the second embodiment, the blowing agent, the thermally expandable microcapsule, and the hollow filler of the other embodiments may be appropriately mixed and used.

EXEMPLARY IMPLEMENTATIONS

The present invention will be described in more detail in the following by way of exemplary implementations, however, the present invention is not limited to these exemplary implementations.

[Manufacturing Insulated Wire]

An insulated wire No. 1 illustrated in Table 1 was manufactured as follows. First, polyimide was used as the main polymer, N-methyl-2-pyrrolidone was used as the solvent, and a resin composition was prepared by diluting the main polymer by this solvent. Next, PMMA particles having an average particle diameter of 3 μm were used as pyrolytic resin particles, and scattered in the resin composition so that the porosity of the insulating layer according to calculated value for the scattered amount becomes 30% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 6 m/minute, then pass the conductor through a stove to bake at 350° C. for 1 minute, to form an insulating coating. The coating of the varnish, passing the conductor through the die, and baking were repeated 15 times, to manufacture the insulated wire (No. 1) having an insulating layer formed by the polyimide resin coating. The average thickness of the insulating layer of the insulated wire No. 1 was 99 μm.

An insulated wire No. 2 illustrated in Table 1 was manufactured as follows. First, polyimide was used as the main polymer, N-methyl-2-pyrrolidone was used as the solvent, and a resin composition was prepared by diluting the main polymer by this solvent. Next, particles having a core shell structure including a PMMA particle core and a silicone shell and having an average particle diameter of 3 μm were used as hollow particles, and scattered in the resin composition so that the porosity of the insulating layer according to calculated value for the scattered amount becomes 30% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 6 m/minute, then pass the conductor through a stove to bake at 350° C. for 1 minute, to form an insulating coating. The coating of the varnish, passing the conductor through the die, and baking were repeated 15 times, to manufacture the insulated wire (No. 2) having an insulating layer formed by the polyimide resin coating. The average thickness of the insulating layer of the insulated wire No. 2 was 100 μm.

An insulated wire No. 3 illustrated in Table 1 was manufactured as follows. First, polyimide was used as the main polymer, N-methyl-2-pyrrolidone was used as the solvent, and a resin composition was prepared by diluting the main polymer by this solvent. Next, PMMA particles having an average particle diameter of 3 μm were used as the pyrolytic resin particles, and scattered in the resin composition so that the porosity of the insulating layer according to calculated value for the scattered amount becomes 50% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 3.5 m/minute, then pass the conductor through a stove to bake at 350° C. for 1 minute, to form an insulating coating. The coating of the varnish, passing the conductor through the die, and baking were repeated 15 times, to manufacture the insulated wire (No. 3) having an insulating layer formed by the polyimide resin coating. The average thickness of the insulating layer of the insulated wire No. 3 was 99 μm.

An insulated wire No. 4 illustrated in Table 1 was manufactured as follows. First, polyimide was used as the main polymer, N-methyl-2-pyrrolidone was used as the solvent, and a resin composition was prepared by diluting the main polymer by this solvent. Next, particles having a core shell structure including a PMMA particle core and a silicone shell and having an average particle diameter of 3 μm were used as hollow particles, and scattered in the resin composition so that the porosity of the insulating layer according to calculated value for the scattered amount becomes 53% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 6 m/minute, then pass the conductor through a stove to bake at 350° C. for 1 minute, to form an insulating coating. The coating of the varnish, passing the conductor through the die, and baking were repeated 15 times, to manufacture the insulated wire (No. 4) having an insulating layer formed by the polyimide resin coating. The average thickness of the insulating layer of the insulated wire No. 4 was 101 μm.

An insulated wire No. 5 illustrated in Table 1 was manufactured as follows. First, polyimide was used as the main polymer, N-methyl-2-pyrrolidone was used as the solvent, and a resin composition was prepared by diluting the main polymer by this solvent. Next, particles having a core shell structure including a PMMA particle core and a silicone shell and having an average particle diameter of 3 μm were used as hollow particles, and scattered in the resin composition so that the porosity of the insulating layer according to calculated value for the scattered amount becomes 30% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 6 m/minute, then pass the conductor through a stove to bake at 350° C. for 1 minute, to form an insulating coating. The coating of the varnish, passing the conductor through the die, and baking were repeated 12 times, to manufacture the insulated wire (No. 5) having an insulating layer formed by the polyimide resin coating. The average thickness of the insulating layer of the insulated wire No. 5 was 80 μm.

An insulated wire No. 6 illustrated in Table 1 was manufactured as follows. First, polyimide was used as the main polymer, N-methyl-2-pyrrolidone was used as the solvent, and a resin composition was prepared by diluting the main polymer by this solvent. Next, particles having a core shell structure including a PMMA particle core and a silicone shell and having an average particle diameter of 3 μm were used as hollow particles, and scattered in the resin composition so that the porosity of the insulating layer according to calculated value for the scattered amount becomes 30% by volume, to prepare a varnish. This varnish was used with an upright coating apparatus, to immerse a conductor having a flat square cross section of 2 mm×2 mm, and thereafter pass the conductor through a die having an opening with a similar shape as the conductor, at a rate of 6 m/minute, then pass the conductor through a stove to bake at 350° C. for 1 minute, to form an insulating coating. The coating of the varnish, passing the conductor through the die, and baking were repeated 20 times, to manufacture the insulated wire (No. 6) having an insulating layer formed by the polyimide resin coating. The average thickness of the insulating layer of the insulated wire No. 6 was 120 μm.

[Evaluation]

The porosity of the insulating layer, the closed porosity within the pores, the insulation breakdown voltage, the rate of layer thickness decrease after pressing, the dielectric constant of the insulating layer, and the dielectric constant of the insulating layer after a solvent immersion test were evaluated according to the following method, for each of the insulated wires No. 1 through No. 6 which were obtained as described above. The results of the evaluation are illustrated in Table 1.

(Porosity of Insulating Layer)

The obtained insulating layer was separated from the conductor in a tubular shape, and a mass W2 of this tubular insulating layer was measured. In addition, an apparent volume V1 was obtained from an outline of the tubular insulating layer, and a density ρ1 of the insulating layer material was multiplied to this V1 to compute a mass W1 for a case where no pores exist. The porosity was computed from the following formula, using values of these W1 and W2.

$$\text{Porosity} = (W1 - W2) \times 100 / W1 (\% \text{ by volume})$$

(Closed Porosity within Pores)

A cross section of the above mentioned insulating layer separated in the tubular shape was observed on a Scanning Electron Microscope (SEM) and binarized so that the pores (closed pores) that are not mutually open due to the resin composition having the insulating properties interposed between adjacent pores, and the pores other than the closed pores, can be distinguished from each other, to compute the closed pores (% per volume) within the pores.

(Insulation Breakdown Voltage)

An insulation breakdown tester ("BREAK-DOWN TESTER "CONTROL UNIT F8150-1"" by FAITH) was used for the measurement. An aluminum film having a width of 10 mm was wrapped around each of the insulated wires No. 1 through No. 6, and one electrode was connected to the conductor, and the other electrode was connected to the aluminum film. The voltage applied across the electrodes was raised at a rate of rise of 500 V/second, and the voltage when a current of 15 mA or larger flows was recorded. The number of times the measurements were made was n=5, and an average value of the measurements was used for the evaluation.

(Rate of Layer Thickness Decrease After Pressing)

Each of the insulated wires No. 1 through No. 6 was set in a pressing machine so that a pressing pressure is applied to a part along a longitudinal direction thereof. A load (N) obtained from "pressing pressure (MPa)"×"press area (mm²)" is applied so that a predetermined pressing pressure is obtained, and the pressing was made for 10 seconds after the load stabilized. An average thickness T1 of the pressed part of the insulating layer, and an average thickness T2 of the non-pressed part of the insulator layer were measured, and the rate of layer thickness decrease after pressing was computed from a formula (T2−T1)×100/T2(%), using the measured values of T1 and T2. The measurement for the rate of layer thickness decrease after pressing was made for each of the pressing pressures of 0 MPa, 100 MPa, 200 MPa, and 300 MPa. In addition, the average thicknesses T1 and T2 of the insulating layer were respectively obtained by averaging the thicknesses measured at 3 points along a cross sectional direction of the insulated wire.

(Dielectric Constant of Insulating Layer)

Figure 4:
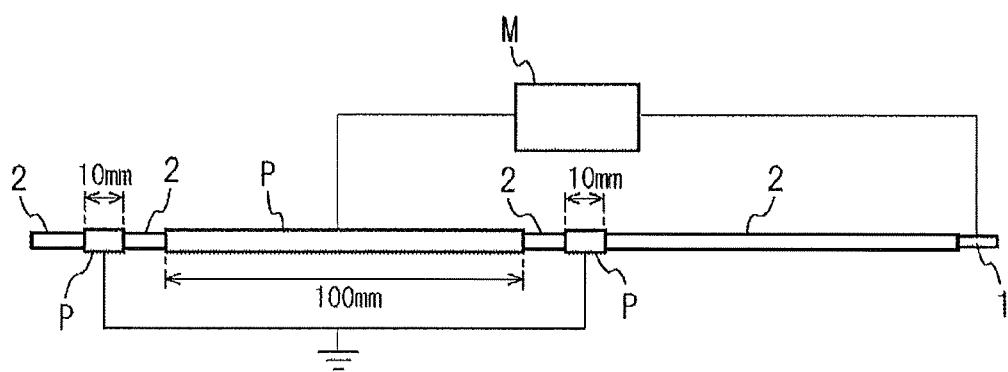
FIG. 4 is a schematic diagram for explaining a dielectric constant measuring method according to one embodiment.

The dielectric constant ε of the insulating layer 2 was measured for each of the insulated wires No. 1 through No. 6. FIG. 4 is a schematic diagram for explaining a dielectric constant measuring method according to one embodiment. In FIG. 4, the same reference numerals used in FIG. 1 are used for the insulated wire. First, a silver paste P was coated on the surface of the insulated wire at 3 locations, and the insulating layer 2 at one end of the insulated wire was stripped to expose the conductor 1, to make a measuring sample. The coating length of the silver paste P along the longitudinal direction of the insulated wire at the 3 locations on the surface of the insulated wire were 10 mm, 100 mm, and 10 mm in this order along the longitudinal direction. The silver paste P coated at the 2 locations with the length of 10 mm were grounded, and an electrostatic capacitance between the silver paste P coated between the 2 locations with the length of 100 mm and the exposed conductor 1 was measured by a LCR meter M. The dielectric constant of the insulating layer 2 was computed from the measured electrostatic capacitance and the average thickness of the insulating layer 2. The measurement of the dielectric constant was made after heating at 105° C. for 1 hour, and the number of times the measurements were made was n=3, and an average value of the measurements was obtained.

(Dielectric Constant of Insulating Layer after Solvent Immersion Test)

The insulated wire in use reaches a high temperature when a high voltage is applied, and in such a case, the insulated wire may be immersed within a solvent, for example, to cool the insulated wire in use. A solvent immersion test was performed in order to confirm that desired properties can be obtained even when the insulated wire in use is immersed within the solvent. More particularly, each of the insulated wires No. 1 through No. 6 was immersed in a test oil IRM903 at 150° C. for 72 hours, and the dielectric constant ε of each insulated wire was thereafter measured. The number of times the solvent immersion tests were made was n=3, and an average value of the measurements was obtained to be compared with the dielectric constant ε before the immersion to the solvent.

TABLE 1

| Insulated Wire No. | | 1 | 2 | 3 | 4 | 5 | 6 |
|---|---|---|---|---|---|---|---|
| Average Thickness (μm) of Insulating Layer | | 99 | 100 | 99 | 101 | 80 | 120 |
| Porosity (Volume %) of Insulating Layer | | 28 | 28 | 50 | 53 | 28 | 28 |
| Closed Porosity (Volume %) Within Pores | | 54 | 99 | 12 | 99 | 99 | 99 |
| Insulation Breakdown Voltage (kV) | | 6.9 | 10 | 4.7 | 9.1 | 8.5 | 12.4 |
| Rate of Layer Thickness Decrease (%) After Pressing | 0 MPa | 0 | 0 | 0 | 0 | 0 | 0 |
| | 100 MPa | 1 | 0.5 | 7 | 4 | 0.5 | 0.5 |
| | 200 MPa | 5 | 3 | 14 | 9 | 3 | 3 |
| | 300 MPa | 12 | 9 | 22 | 15 | 8 | 9 |
| Dielectric Constant of Insulating Layer | | 2.3 | 2.2 | 1.9 | 1.8 | 2.2 | 2.2 |
| Dielectric Constant of Insulating Layer After Solvent Immersion Test | | 2.6 | 2.2 | 2.5 | 1.8 | 2.2 | 2.2 |

From the results illustrated in Table 1, it may be seen that the insulated wires No. 2, No. 4, No. 5, and No. 6 having closed porosities within the pores of the insulating layer that are 80% per volume or higher, have insulation breakdown voltages that are high compared to those of the insulated wires No. 1 and No. 3 not having the above mentioned properties, and have reduced rates of layer thickness decrease after pressing. In addition, it may be seen that the insulated wires No. 2, No. 4, No. 5, and No. 6 having the outer shell, in the peripheral part of the pores included in the insulating layer, and derived from the shell of the hollow forming particle having the core shell structure, maintain the dielectric constant even after the solvent immersion test. From these results, it may be seen that the insulated wires No. 2, No. 4, No. 5, and No. 6 having the above mentioned properties can promote lowering of the dielectric constant of the insulating layer, and have good insulating properties, mechanical strength, and solvent resistance. It may be regarded that these properties are attributable to the extremely small size and shape variations of the pores that are formed by the thermal decomposition of the core of the hollow forming particle having the core shell structure.

DESCRIPTION OF THE REFERENCE NUMERALS

1: Conductor, 2: Insulating Layer, 3: Pore, 4: Outer Shell, 5: Hollow Forming Particle, 6: Core, 7: Shell, M: LCR Meter, P: Silver Paste

The invention claimed is:

1. An insulated wire comprising:
a linear conductor having an outer peripheral surface; and
one or a plurality of insulating layers provided on the outer peripheral surface of the conductor,
wherein at least one layer of the one or plurality of insulating layers includes a plurality of pores,
wherein a closed porosity within the plurality of pores, indicating a percentage by volume of closed pores that are not mutually open due to a resin composition having insulating properties interposed between adjacent pores with respect to all of the plurality of pores, is 80% by volume or higher,
wherein a lower limit of a proportion of pores having a short axis thereof oriented in a perpendicular direction to the surface of the conductor with respect to a total number of the plurality of pores is 60%, the pores having the short axis thereof oriented in the perpendicular direction to the surface of the conductor having an angular difference of 20 degrees or less between the short axis of the pores and the perpendicular direction to the surface of the conductor, and wherein an average ratio of lengths of a minor axis with respect to a major axis, in a cross section including the minor axis and the major axis of the plurality of pores, has a lower limit of 0.2 and an upper limit of 0.95.

2. The insulated wire as claimed in claim 1, wherein a porosity of the one layer of the one or plurality of insulating layers is 20% by volume or higher.

3. The insulated wire as claimed in claim 2, further comprising:

an outer shell at a peripheral part of the plurality of pores, wherein the outer shell is derived from a shell of hollow forming particles having a core shell structure.

4. The insulated wire as claimed in claim 3, wherein a main component of the outer shell is silicone.

5. The insulated wire as claimed in claim 4, wherein an average diameter of the plurality of pores is 0.1 μm or greater and 10 μm or less.

6. The insulated wire as claimed in claim 5, wherein a ratio of a standard deviation of the average diameter with respect to the average diameter of the plurality of pores is 0.3 or less.

7. The insulated wire as claimed in claim 3, further comprising:

a primer layer between the conductor and the one layer of the one or plurality of insulating layers.

8. The insulated wire as claimed in claim 1, further comprising:

an outer shell at a peripheral part of the plurality of pores, wherein the outer shell is derived from a shell of hollow forming particles having a core shell structure.

9. The insulated wire as claimed in claim 8, wherein a main component of the outer shell is silicone.

10. The insulated wire as claimed in claim 1, wherein an average diameter of the plurality of pores is 0.1 μm or greater and 10 μm or less.

11. The insulated wire as claimed in claim 10, wherein a ratio of a standard deviation of the average diameter with respect to the average diameter of the plurality of pores is 0.3 or less.

12. The insulated wire as claimed in claim 1, further comprising:

a primer layer between the conductor and the one layer of the one or plurality of insulating layers.

13. The insulated wire as claimed in claim 1, wherein the plurality of insulating layers, including the one layer that includes the plurality of pores, are laminated on the outer peripheral surface of the conductor.

14. The insulated wire as claimed in claim 13, wherein the plurality of insulating layers include one or more insulating layers laminated on at least one of an outer peripheral surface and an inner peripheral surface of the one layer that includes the plurality of pores.

15. The insulated wire as claimed in claim 13, wherein the plurality of insulating layers include a first layer that is made of a first material having a first dielectric constant and no pores, the plurality of insulating layers, excluding the first layer, are made of a second material having a second dielectric constant, and an upper limit of a ratio of the second dielectric constant with respect to the first dielectric constant is 95%.

* * * * *